3,338,693
FUSION OF GLASS PARTICLES WITH BRIEF HIGH INTENSITY LIGHT FLASHES

Eugene C. Letter, Penfield, N.Y., assignor to Bausch & Lomb Incorporated, Rochester, N.Y., a corporation of New York
No Drawing. Filed June 25, 1964, Ser. No. 378,036
5 Claims. (Cl. 65—18)

This invention relates to a novel method for fusing glass particles to each other or to other articles.

Numerous methods have been proposed in the prior art for forming ceramic metallic bonds. Such methods for example are disclosed in the copending application of Hensler and Letter entitled, "Method for Forming Ceramic Metallic Bonds," filed June 24, 1964, Ser. No. 377,500 and assigned to the same assignee as the present invention.

The methods disclosed in the aforementioned application as well as those other methods known to the prior art are suitable for a limited number of applications. They are not however, generally suitable for those cases wherein it is desirable to fuse a glass article to a relatively low melting or thermally unstable element. For example, attempts to fuse glass to plastics presents additional problems. Problems are also encountered in those cases wherein it is desired to coat a glass article with a thin layer of glass without raising the temperature of the supporting element.

Advantageously, the present invention provides a method of fusing glass particles to a dissimilar element without raising the temperature of the dissimilar element by a significant amount. Notwithstanding the low temperature transfer the present method produces a fused glass bond rather than a cement or plastic bond.

The method according to the present invention utilizes an intense beam of light which is delivered in a brief interval of time. For example, a suitable flash lamp may be used. Lamps of this type are available which deliver their peak energy within one to two microseconds. The preferred lamps includes those lamps having a flash duration of about 100 microseconds to 100 milliseconds. In some cases it may also be desirable to use a laser for producing the illumination. For example, a suitable laser may be utilized in those cases wherein it is desirable to illuminate a small spot or in those cases wherein the glass absorbs primarily in the infrared portion of the spectrum but transmits visible light.

The high intensity brief light flashes are utilized to fuse a glass powder comprising a pulverulent mass of light absorbing glass, wherein the pulverulent mass has a particle size which is sufficiently small so that it may be fused by a brief intense flash of light. The size of the particle is so chosen that the fusion temperature is reached during the light flash.

Briefly, the method disclosed herein comprises the steps of providing a light absorbing glass, and comminuting the glass to thereby provide the desired particle size. A mass of the pulverulent glass having small particle sizes is subjected to a brief intense flux of light to thereby fuse the particles.

It has now been found highly desirable to fuse a glass onto a relatively soft surface of plastic or other materials for example, to produce a plastic lens having improved scratch resistance. A light absorbing glass is powdered and the surface of the article uniformly covered with the powder. The powder is then fused to the soft surface by exposing the powder to a brief intense flash of light. Generally the powder may be applied by spraying techniques or other means and subsequently exposed to a brief high intensity light flux.

The particle size of the powder, the intensity of light and the time of exposure are interdependent and may be determined by the following formula which has been previously set forth in the Journal of Physical Chemistry, March 1959, pages 433-436 in an article by Nelson and Lundberg. The formula $$F = \frac{T-T_0}{\alpha_1} \cdot \frac{P_1 C_p r}{3} + \frac{K_2 \Delta T}{r} + \sigma \alpha_1 \Delta t (T^2 + t_0^2)(T + T_0)$$

transposing this formula to the following form $$(T-T_0) = \frac{\alpha_1 F}{\frac{P_1 C_p r}{3} + \frac{K_2 t}{r} + \alpha_1 \sigma \Delta t (T^2 + T_0^2)(T + T_0)}$$

wherein $(T-T_0)$ = temperature rise of a particle
$C_p$ = heat capacity of the particle (cal./gm. degree)
$r$ = radius of the particle
$\alpha_1$ = emissivity of the particle
$P_1$ = density of the particle
$F$ = radiant flux (cal./cm.$^2$)
$t$ = duration of light (sec.)
$K_2$ = thermal conductivity of matrix
$\sigma$ = Stefan-Boltzmann rad. const.

provides the following data which shows the flux requirements for various duration of light and different particle sizes.

$$F = 2.9 \times 10^2 + 8.0 \times 10^{-2} \frac{\Delta T}{r} + 1.2 \times 10 \Delta T$$

*T = 500 microseconds = 5×10$^{-4}$ seconds*

| | |
|---|---|
| $r$=100 microns=10$^{-2}$ cm. | $F$=2.9 cal./cm.$^2$ |
| $r$=10 microns=10$^{-3}$ cm. | $F$=0.33 cal./cm.$^2$ |
| $r$=1 micron=10$^{-4}$ cm. | $F$=0.44 cal./cm.$^2$ |
| $r$=0.1 micron=10$^{-5}$ cm. | $F$=4.0 cal./cm.$^2$ |

*T = 100 microseconds = 1×10$^{-4}$ seconds*

| | |
|---|---|
| $r$=100 microns | $F$=2.9 cal./cm.$^2$ |
| $r$=10 microns | $F$=0.30 cal./cm.$^2$ |
| $r$=1 micron | $F$=0.11 cal./cm.$^2$ |
| $r$=0.1 micron | $F$=0.80 cal./cm.$^2$ |

*T = 10 microseconds = 1×10$^{-5}$ seconds*

| | |
|---|---|
| $r$=100 microns | $F$=2.9 cal./cm.$^2$ |
| $r$=10 microns | $F$=0.29 cal./cm.$^2$ |
| $r$=1 micron | $F$=0.037 cal./cm.$^2$ |
| $r$=0.1 micron | $F$=0.08 cal./cm.$^2$ |

*T = 1 microsecond = 1×10$^{-6}$ seconds*

| | |
|---|---|
| $r$=100 microns | $F$=2.9 cal./cm.$^2$ |
| $r$=10 microns | $F$=0.29 cal./cm.$^2$ |
| $r$=1 micron | $F$=0.030 cal./cm.$^2$ |
| $r$=0.1 micron | $F$=0.011 cal./cm.$^2$ |

*T = 0.1 microsecond = 1×10$^{-7}$ seconds*

| | |
|---|---|
| $r$=100 microns | $F$=2.9 cal./cm.$^2$ |
| $r$=10 microns | $F$=0.29 cal./cm.$^2$ |
| $r$=1 micron | $F$=0.029 cal./cm.$^2$ |
| $r$=0.1 micron | $F$=0.0037 cal./cm.$^2$ |

If the particles do not behave as a perfect black body and if alpha 1 is equal to 0.5 the values of F should be increased to approximately twice those shown.

The above calculations show that the time duration of the light flash should be very brief i.e. in the neighborhood of 100 microseconds. Furthermore the radius of the particle should preferably be within the range of 1 to 10 microns.

An alkali borosilicate glass including cobalt, see for example those glasses disclosed and claimed in the copending application of Gordon Brewster and Robert A. Weidel entitled "Glass Composition," Ser. No. 377,124, filed June 22, 1964 and asigned to the assignee of the present invention is comminuted or powdered by grinding in a mortar to a particle size within the aforementioned range. The powder was applied to a portion of a glass slide and also to a piece of "Lucite." The application may be made by dusting the dry powder onto the substrate or by spraying a mixture comprising a carrier such as isopropyl alcohol or water having the powder dispersed therein onto the substrate.

Both samples were exposed to a laser flash lamp at 3000 volt charge. The glass particles fused and adhered strongly to the glass. The bond between the glass and the plastic was not as strong as the glass to glass bond, however, a finer particle size and a shorter duration flash should substantially improve the bond.

The glass used in the preferred embodiment of the invention consisted essentially of the following formula by weight percent batch basis.

| | |
|---|---:|
| $SiO_2$ | 41.91 |
| $K_2O$ | 5.44 |
| $Na_2O$ | 11.39 |
| $Li_2O$ | 2.50 |
| $B_2O_3$ | 13.11 |
| $Co_3O_4$ | 25.65 |

Other glasses including those disclosed in the aforementioned application which have desirable absorption properties can be readily substituted without departing from the scope of the present invention. For example, a lead silicate glass in which the lead had been slightly reduced was also used.

Other possible uses of this process relate to coating a glass article with a second layer of a glass wherein the expansion rates are so chosen that the first glass may be put into compression for high strength. Glass articles may also be decorated by colored glasses or reticles may be added in a similar manner. Furthermore, the process may be used to project desired designs onto a glass. Additionally, it is presently thought that the processes disclosed herein are particularly applicable for hermetically sealing electronic components such as transistors. In those cases, it is desired to obtain the physical and chemical properties of a glass having a high fusion temperature, which temperature is incompatible with the electronic component.

While the invention has been described with respect to certain examples, it should be understood that the invention be modified or embodied in other forms without departing from the scope of the appended claims.

What is claimed is:

1. A method for fusing glass comprising the steps of providing a light absorbing glass, comminuting the glass to thereby provide a desired paritcle size and subjecting the glass particles to a brief high intensity flash of light of sufficient duration to fuse the particles.

2. A method for fusing glass according to claim 1 in which the glass is comminuted to a particle size of less than 100 microns.

3. A method for fusing glass according to claim 1 in which the glass is comminuted to a particle size of between .1 to 100 microns.

4. A method for fusing glass according to claim 1 in which the flux of light has a duration of about 100 microseconds to 100 milliseconds.

5. A method for fusing glass according to claim 1 in which the parameters are determined by the following formula $$(T-T_0) = \frac{\alpha_1 F}{\frac{P_1 C_p r}{3} + \frac{K_2 t}{r} + \alpha_1 \sigma \Delta T(T^2 + T_0^2)(T+T_0)}$$

wherein $(T-T_0)$ = temperature rise of the particle
$C_p$ = heat capacity of the particle (cal./gm. degree)
$r$ = radius of the particle
$\alpha_1$ = emissivity of the particle
$P_1$ = density of the particle
$F$ = radiant flux in cal./cm.$^2$
$t$ = duration of light in seconds
$K_2$ = thermal conductivity of the matrix
$\sigma$ = Stefan-Boltzmann radiation constant.

References Cited

UNITED STATES PATENTS

| 3,210,171 | 10/1965 | MacDonald | 65—43 |
| 3,217,088 | 11/1965 | Steierman | 156—272 |
| 3,282,669 | 11/1966 | Pinkham et al. | 65—36 |

DONALL H. SYLVESTER, *Primary Examiner.*

G. R. MYERS, *Assistant Examiner.*